United States Patent [19]

Miles

[11] Patent Number: 4,987,916

[45] Date of Patent: Jan. 29, 1991

[54] LIQUID FLOW CONTROL DEVICE

[75] Inventor: Peter Miles, Crowthorne, England

[73] Assignee: Hydro-Tec Limited, Newbury, England

[21] Appl. No.: 372,385

[22] PCT Filed: Oct. 10, 1988

[86] PCT No.: PCT/GB88/00894

§ 371 Date: Jun. 19, 1989

§ 102(e) Date: Jun. 19, 1989

[87] PCT Pub. No.: WO89/03554

PCT Pub. Date: Apr. 20, 1989

[30] Foreign Application Priority Data

Oct. 9, 1987 [GB] United Kingdom ............... 8723763

[51] Int. Cl.$^5$ ........................................... G05D 11/03
[52] U.S. Cl. ................................. 137/100; 137/503; 137/625.31
[58] Field of Search ........... 137/100, 114, 503, 625.31; 251/309

[56] References Cited

U.S. PATENT DOCUMENTS

| | | | |
|---|---|---|---|
| 1,290 | 8/1839 | Kellogg | 251/309 |
| 2,496,586 | 2/1950 | Kemp et al. | 137/503 X |
| 3,047,003 | 7/1962 | Gurney | 137/100 |
| 3,141,471 | 7/1964 | Williamson | 137/114 |
| 3,642,021 | 2/1972 | Muller et al. | 137/114 |
| 3,647,002 | 3/1972 | Lindsay | 137/98 |
| 4,554,943 | 11/1985 | Claney et al. | 251/309 |

FOREIGN PATENT DOCUMENTS 949008 9/1956 Fed. Rep. of Germany ...... 137/504

Primary Examiner—Stephen M. Hepperle
Attorney, Agent, or Firm—Robert W. J. Usher

[57] ABSTRACT

A liquid flow control device (20) comprises a variable orifice (28/30) in a conduit (15), and branch lines (41, 42) above and below a flow restriction, which may be the variable orifice itself. The orifice is controlled to maintain a predetermined relation between the pressures ($P_1$, $P_2$) in the two branches. A metering valve (60) for a second liquid to be injected into the conduit may be controlled simultaneously to maintain a preset ratio between the flow coefficients of the valve and the orifice, so that if the pressures above and below the metering valve are the same as the pressures above and below the variable orifice, the respective flow rates will stay in the same proportion, and the proportion of second liquid injected into the liquid in the conduit will be constant at all flow rates. The orifice control may be by piston and cylinder (50, 52) driven by the liquid pressures in the branch lines, the moving piston turning an orifice control rod (36) which also rotates a variable plug (62) in the metering valve. The specific application is for the injection of foam concentrate into a fire water distribution system, especially on an offshore oil platform, where flow rates and pressures will vary in use according to the instantaneous demands for water. The metering device is capable of handling water flows between 100 and 2250 m$^3$/hr. at pressures of around 15 bar while providing an output solution within about ±10% of the 1%, 3% or 6% target concentration over the full range of pressure and flow conditions, with the ability to withstand surge pressures as high as 30 bar.

13 Claims, 3 Drawing Sheets

LIQUID FLOW CONTROL DEVICE

This invention relates to a liquid flow control device. In a preferred embodiment the invention is concerned with a device for metering controlled amounts of one liquid into another liquid flowing through a conduit at high pressures and flow rates.

The preferred device according to the invention finds particular use in controlling the injection of a surface-active agent into a fire water distribution system, to produce a foam when the water is released into a fire zone at atmospheric pressure. A typical class of agents is known as AFFF, aqueous film-forming foam, and is injected as a concentrate into the fire water to give a concentration of AFFF in the resultant solution of 1%, 3% or 6% according to operational requirements and the nature of the particular AFFF additive used.

On an offshore oil or gas platform the AFFF is injected into sea water for firefighting purposes, and the quantities of water required to be delivered by the fire-pumps can typically vary from 100 to 2250 m$^3$/hr. at pressure of around 15 bar. Flow rates and pressures will however vary in use according to the instantaneous demands for water being made on the system, and it is necessary to vary the injection rate in order to maintain the correct AFFF concentration in the water in spite of these fluctuations.

The currently used method of proportioning the AFFF to the water requires a main venturi to be installed in the conduit supplying fire water to the ring main on the platform, and a second venturi to be installed in the AFFF injection line. The AFFF is injected into the water at the throat of the main venturi. The AFFF is supplied to the second venturi at the same pressure as the water is supplied to the main venturi. The two venturis have flow coefficients in a fixed ratio, so that the ratio of AFFF introduced into the water at the throat of the main venturi is in the required proportion to the volume of water flowing. The disadvantages of this method include high pressure losses when working at high flow rates; low pressure losses at low flow rates, leading to inaccurate proportioning; and the readily available equipment having a maximum flow rate capability at the present time of only 1000 m$^3$/hr.

The present invention provides a flow control device with different characteristics, enabling some or all of these disadvantages to be mitigated.

In one aspect, the invention provides a flow control device for controlling liquid flow through a conduit, comprising a variable orifice in the liquid flow path in the conduit, a first branch line for liquid connected to the conduit upstream of liquid flow restriction means in the conduit, a second branch line for liquid connected to the conduit downstream of said liquid flow restriction means, and orifice control means operatively connected to the variable orifice and responsive to the liquid pressures in the first and second branch lines to vary the orifice to maintain a predetermined relation between the pressures in the said lines.

The orifice control means may comprise piston and cylinder means adapted to be driven by the liquid pressures in the first and second branch lines. The predetermined relation between the pressures in the said lines may for example be a pressure ratio, a pressure difference, or a combination of these, and will normally be determined by the design of the orifice control means.

The restriction may be a fixed restriction, such as a fixed orifice plate, downstream of the variable orifice, in which case the device can function as a flow regulator valve to maintain a constant liquid flow rate through the restriction. However, in the preferred application of the device, the restriction is the variable orifice itself, and the device then varies the flow coefficient of the orifice in order to maintain a predetermined relation between the pressures on either side of the variable orifice. Accordingly, in a second aspect, the invention provides a device for metering a second liquid into a liquid flowing through a conduit, comprising a flow control device as aforesaid, wherein the restriction is the variable orifice, a supply line for the second liquid leading into the conduit downstream of the variable orifice where the pressure is substantially the same as the pressure in the second branch line, and a variable metering valve in the supply line for metering the second liquid, wherein the metering valve is supplied with the second liquid at substantially the same pressure as the pressure in the first branch line and is adapted to be driven by the orifice control means to vary its flow coefficient in a predetermined ratio to the varying flow coefficient of the variable orifice.

In such a metering device, the pressure drop is related to the liquid supply pressure in the conduit, rather than to the liquid flow rate. It has been found that such a device can deliver higher liquid flows than are at present readily available with venturi-based devices.

In order to meter a substantially constant proportion of the second liquid into the first, the variable metering valve is configured to maintain a substantially constant ratio between the flow coefficients of the metering valve and the variable orifice, when both are driven by the orifice control means.

The invention will now be further described with reference to the accompanying diagrammatic drawings, not to scale, which show one embodiment of the invention by way of example only.

Figure 1:
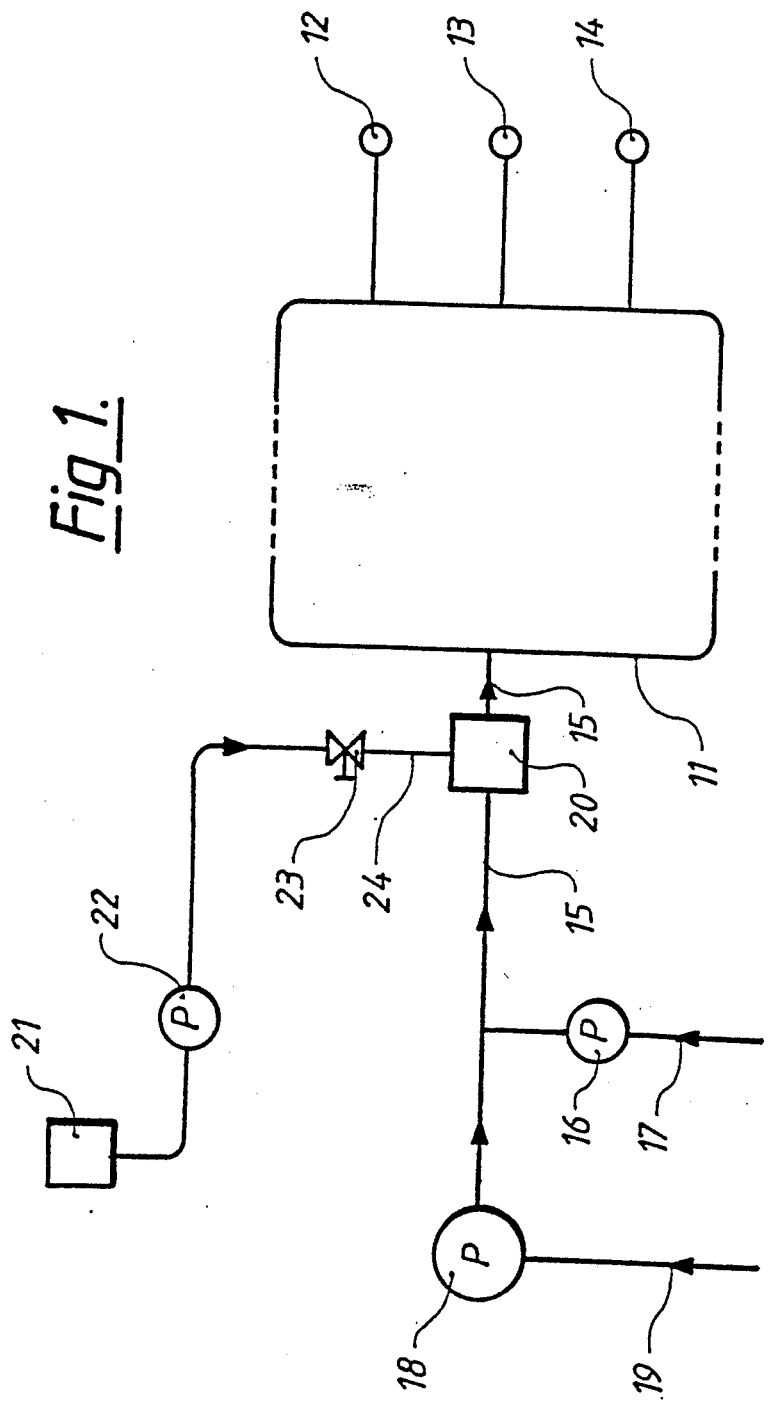
FIG. 1 is a diagram of a typical working environment for a device for metering a second liquid into a first liquid flowing through a conduit, in this case a foam proportioning device in an offshore platform fire water system.

FIG. 1 shows a main platform water ring main 11 for supplying fire water to a variety of hydrants 12, sprinklers 13 and process area deluge systems 14. The main is normally pressurised at about 8 bar with sea water supplied through conduit 15 by jockey pump 16 from sea water inlet pipe 17.

When the pressure in the ring falls because of fire water demand, main fire pump 18 is activated and pumps sea water from inlet pipe 19 at a pressure of about 15 bar through foam proportioning unit 20 into conduit 15.

The foam proportioning unit 20 is supplied with liquid foam concentrate (AFFF) from reservoir 21 by pump 22 through shut-off valve 23 in foam inlet line 24. Provided that valve 23 is open, the proportioning unit 20 meters the foam concentrate into the main water supply conduit 15, maintaining the required concentration of 1%, 3% or 6% in spite of the variations in water flow through the conduit.

Figure 2:
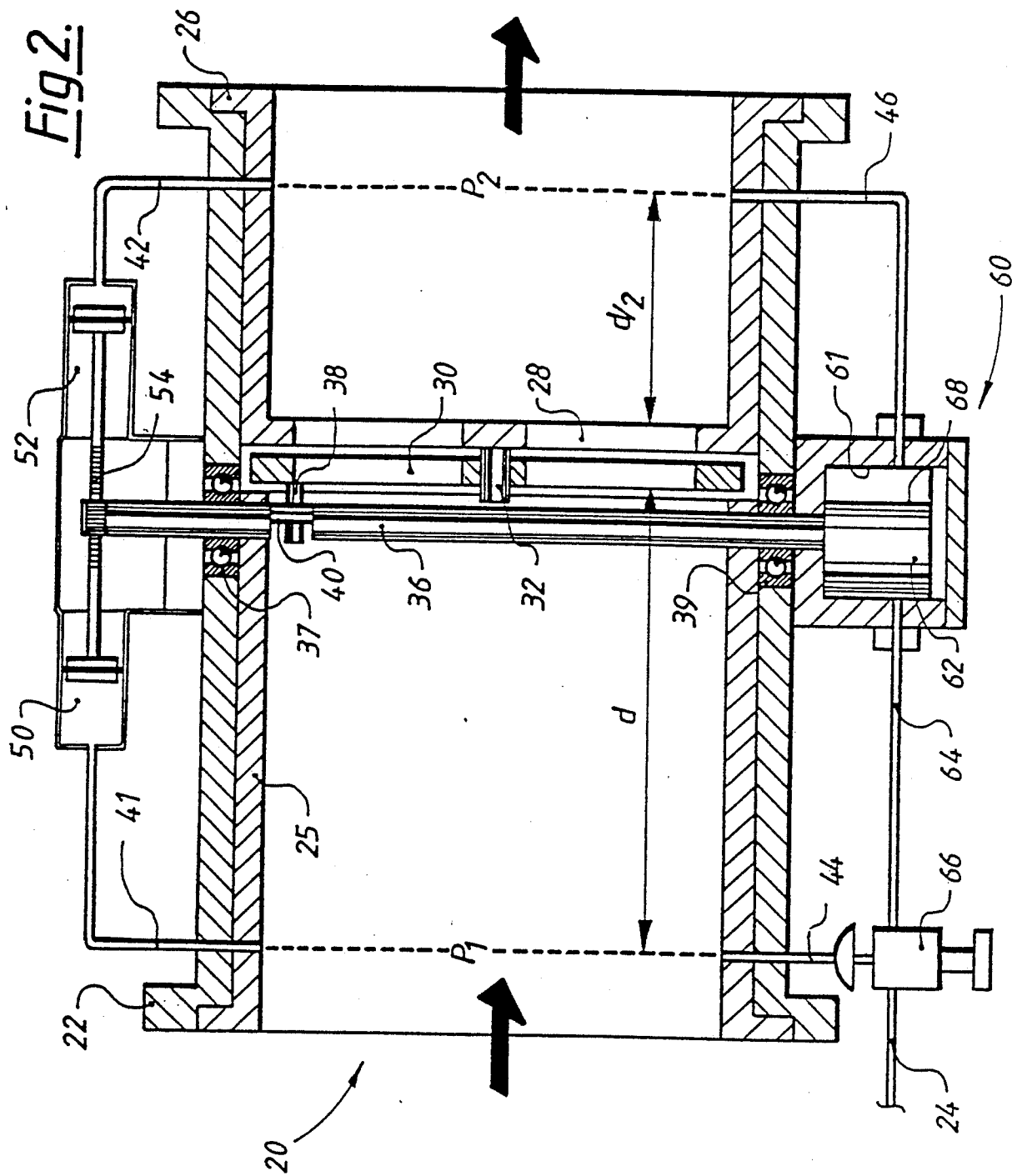
FIG. 2 is a sectional view of the device, seen from one side.

The metering device of the invention is used as the foam proportioning unit, and is shown in detail in FIG. 2

The device 20 is located in the main conduit 15, which may be about 400 mm in diameter. Water is pumped through in the direction of the arrows. The device includes a cylindrical housing 22 enclosing an inlet collar 25, and an outlet collar 26 which carries a fixed orifice plate 28 across the conduit. A second orifice plate 30 is rotatably mounted on a central pin 32 on the upstream face of the fixed orifice plate, between the inlet collar and the outlet collar. The rotation of this second plate is controlled by a rod 36 extending diametrically across the housing 22 in front of the upstream face of the plate and extending beyond the housing through seals 37, 39.

Figure 3:
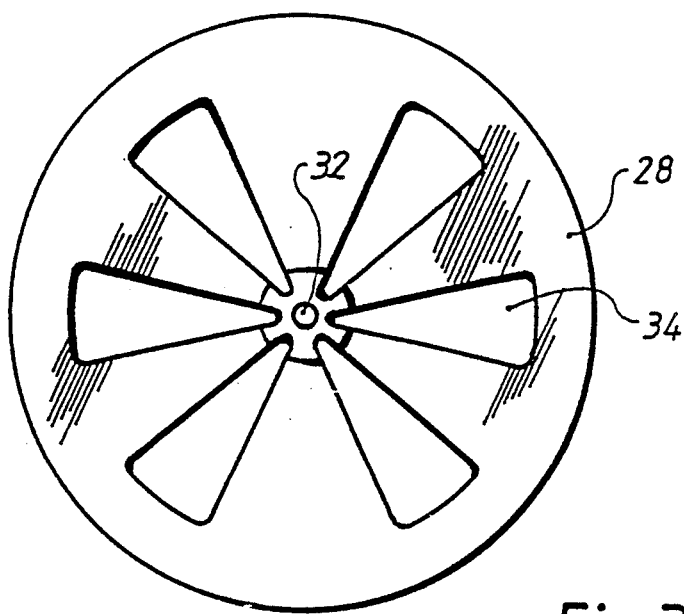
FIG. 3 is a front elevation of a fixed orifice plate used in the device.

FIG. 3 shows the fixed orifice plate 28, with six generally triangular flow passages 34 and the central mounting pin 32 for the movable plate 30.

Figure 4:
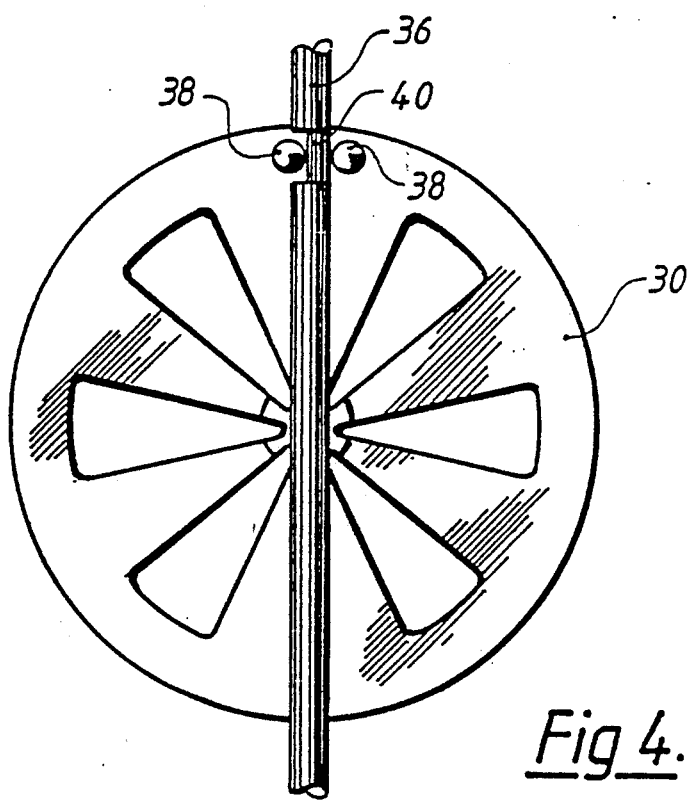
FIG. 4 is a front elevation of a movable orifice plate used in the device.

The movable orifice plate 30 and associated control rod 36 are shown in FIG. 4. The movable plate is substantially identical in form to the fixed plate 28 on which it is mounted, but is provided with two pins 38 projecting from its upstream face. The rod 36 is provided with an eccentric portion 40 which is located between the pins 38, so that axial rotation of the rod causes the eccentric to rotate the plate 30 over the plate 28. The plates 28 and 30 together constitute a variable orifice plate. The arrangement is such that at one extreme the flow passages in the two plates are aligned, giving a free effective area for water flow of 50-60%, typically 54%, of the conduit's area, and at the other extreme the flow passages are offset, giving a free effective area of only 0-10%, typically 4%.

The housing 22 and the inlet collar 25 are tapped at a distance of about one conduit diameter d upstream of the variable orifice plate 28/30, where the liquid pressure is P$_1$, to supply two branch lines 41, 44 at that pressure. Similarly, the housing 22 and the outlet collar 26 are tapped at a distance of about half one conduit diameter downstream of the variable orifice plate 28/30, where the liquid pressure is P$_2$, to supply to branch lines 42, 46 at that pressure.

Tappings 41 and 42 provide liquid at pressure P$_1$ and P$_2$ respectively to control the rotation of orifice plate control rod 36. This is achieved in the illustrated embodiment of the invention by taking pressure P$_1$ to piston and cylinder assembly 50 and pressure P$_2$ to piston and cylinder assembly 52. The two assemblies share a common piston rod 54 which is linked to orifice control rod 36 by, for example, a rack and pinion drive.

The effects on the liquid pressures in the conduit will depend on the detailed design. For example, the relation between the pressures P$_1$ and P$_2$ at equilibrium will be determined by the relative effective working areas of the pistons in the piston and cylinder assemblies 50 and 52, and any other forces which may be applied to the piston and cylinder assemblies. In this example, the area of cylinder 50 is less than that of cylinder 52, which results in a predetermined differential being maintained between P$_1$ and P$_2$.

In operation, the relation between P$_1$ and P$_2$ is maintained, in spite of fluctuations in the water flow through the conduit 15, because variations cause the piston rod 54 to move, driving the orifice control rod 36 and varying the orifice 28/30 until the relation is re-established.

On the opposite side of the housing 22 is a variable metering valve 60 for liquid foam concentrate. The valve 60 comprises cylindrical chamber 61 containing a rotary plug 62 mounted on the further end of the orifice control rod 36. The chamber 61 has an outlet connected to the branch line 46 and an inlet 64 connected to the foam concentrate inlet line 24 by way of a pilot operated regulator valve 66, which is controlled by water at pressure P$_1$ in branch line 44 to admit the liquid foam concentrate from the line 24 to the inlet side of the chamber 61 at the same pressure P$_1$. The outlet side of the chamber is at pressure P$_2$, the pressure in the branch line 46.

The rotary plug 62 is provided with a reduced radius portion 68 over part of its circumference. Liquid foam concentrate can only flow from the chamber inlet to the chamber outlet over this portion, between the plug and the inner wall of the chamber. The amount of liquid that flows is regulated by rotation of the plug, constraining the liquid to flow through a narrower or wider gap. The movement of the plug is directly linked to the movement of the variable orifice plate 28/30 by the control rod 36. Liquid flows through the metering valve 60 at the same pressure differential, P$_1$-P$_2$, as the liquid flowing through the variable orifice. The absolute value of P$_1$-P$_2$ is typically limited to within the range 0.35 to 0.75 bar.

The dimensions of the reduced radius portion 68 are previously matched to the variable orifice so that the flow coefficients of the metering valve and the variable orifice are in a substantially constant ratio over their full ranges of movement, the ratio typically being chosen to give a 1:99, 3:97 or 6:94 proportion of liquid foam concentrate to water downstream of the metering device at all flow rates. The proportion of foam can readily be changed by replacing one rotary plug 62 with another having a differently configured reduced radius portion 68.

A metering device of this kind is capable of handling water flows between 100 and 2250 m$^3$/hr. while providing an output solution within about ±10% of the 1%, 3% or 6% target concentration over the full range of pressure and flow conditions, with the ability to withstand surge pressures as high as 30 bar.

Although the invention is described herein in terms of specific elements and combinations of elements, it is envisaged that each element may be combined with any other or with any combination of other elements. The invention is not limited only to the particular combinations of elements recited, which may not be indispensable to the invention; alternatives may be employed. The invention lines in all matters disclosed and is not necessarily limited to the specific statements of the invention put forward herein.

I claim:

1. A device for metering a second liquid into a first liquid flowing through a conduit, comprising: a variable, flow controlling orifice in the liquid flow path in the conduit; orifice control means, responsive to the liquid pressures in the liquid flow path at locations spaced apart from and, respectively, upstream and downstream of the variable orifice, for varying the orifice to maintain a predetermined relation between the said liquid pressures at the said upstream and downstream locations; a supply line for the second liquid leading into the conduit downstream of the variable orifice at a position adjacent the said downstream location and where the liquid pressure is substantially the same as the liquid pressure at the said downstream location; and a variable metering valve in the supply line for metering the second liquid; wherein the metering valve is supplied with the second liquid at substantially the same pressure as the liquid pressure at the said upstream location and is adapted to be driven by the orifice control means to vary its flow coefficient in a predetermined ratio to the varying flow coefficient of the variable orifice.

2. A metering device according to claim 1 comprising a first branch line connected to the conduit at the said location upstream of the variable orifice and a second branch line connected to the conduit at the said location downstream of the variable orifice, and wherein the orifice control means is respective to the pressures of the first liquid in said branch lines.

3. A metering device according to claim 2 wherein the orifice control means comprise piston and cylinder means adapted to be driven by the liquid pressures in the first and second branch lines.

4. A metering device according to claim 2 wherein the first branch line is connected to the conduit at a distance of about one conduit diameter upstream of the variable orifice, and the second branch line, and the supply line for the second liquid, are connected to the conduit at a distance of about half one conduit diameter downstream of the variable orifice.

5. A metering device according to claim 1 wherein the variable metering valve is configured to maintain a substantially constant ratio between the flow coefficients of the metering valve and of the variable orifice, when both are driven by the orifice control means.

6. A metering device according to claim 5 wherein the variable metering valve comprises a chamber having an inlet and an outlet and containing a rotary plug provided with a reduced radius portion over part of its circumference defining a flow path from the inlet to the outlet between the plug and an inner wall of the chamber, so that rotation of the plug constrains the liquid to flow along a narrower or wider portion of the flow path, and the dimensions of the plug are matched to the variable orifice so that the flow coefficients of the metering valve and of the variable orifice are in a substantially constant ratio over their full ranges of movement.

7. A metering device according to claim 1 wherein the variable orifice comprises a fixed orifice plate extending across the conduit, a second orifice plate rotatably mounted on the upstream face of the fixed orifice plate, a plurality of flow passages in the two plates, and an orifice control rod provided with an eccentric portion located between two projections from the upstream face of the second orifice plate, whereby axial rotation of the rod causes the eccentric to rotate the second plate over the fixed plate and thereby vary the alignment of the flow passages in the two plates.

8. A metering device according to claim 7 wherein the orifice control means comprise a common piston rod carrying a first piston driven by liquid from the first branch line and a second piston drive in an opposite sense by liquid from the second branch line, the piston rod being linked to the orifice control rod whereby axial movement of the piston rod rotates the orifice control rod.

9. A metering device according to claim 8 wherein the first and second pistons are of different effective areas.

10. A metering device according to claim 8 wherein the rotary plug is driven by the orifice control rod whereby rotation of the plug is linked to rotation of the second plate of the variable orifice.

11. A metering device according to claim 1 wherein the metering valve comprises a pilot operated regulator controlled by liquid supplied from the conduit upstream of the variable orifice where the liquid pressure is substantially the same as the liquid pressure at the said upstream location, to admit the second liquid to the inlet of the valve at substantially the same pressure.

12. A fire water distribution system comprising a water supply conduit and a metering device according to claim 1 for metering a solution of a surface-active agent into the water in the conduit.

13. A device for metering a second liquid into a first liquid flowing through a conduit, comprising:

a variable, flow controlling orifice comprising a fixed orifice plate extending across the conduit, a second orifice plate rotatably mounted on the upstream face of the fixed orifice plate, a plurality of flow passages in the two plates, and means for rotating the second plate over the fixed plate thereby varying the alignment of the flow passages in the two plates;

orifice control means connected to the means for rotating the second plate, and responsive to the liquid pressures in the liquid flow path at locations spaced apart form and, respectively, upstream and downstream of the variable orifice for varying the orifice to maintain a predetermined relation between the said liquid pressures at the said upstream and downstream locations;

a supply line for the second liquid leading into the conduit downstream of the variable orifice at a position adjacent the said downstream where the liquid pressure is substantially the same as the liquid pressure at the said downstream location; and a variable metering valve in the supply line for metering the second liquid; wherein the metering valve is supplied with the second liquid at substantially the same pressure as the liquid pressure at the said upstream location and is adapted to be driven by the orifice control means to vary its flow coefficient in a predetermined ratio to the varying flow coefficient of the variable orifice.

* * * * *

UNITED STATES PATENT AND TRADEMARK OFFICE
CERTIFICATE OF CORRECTION

PATENT NO. : 4,987,916
DATED : Jan. 29, 1991
INVENTOR(S) : Peter Miles

It is certified that error appears in the above-identified patent and that said Letters Patent is hereby corrected as shown below:

Column 4, Line 52, "lines" should read --lies--.
Column 5, Line 15, "respective" should read --responsive--
Column 6, Line 39, "form" should read --from--;
Column 6, Line 46, "downstream" should read --downstream location--

Signed and Sealed this

Fourteenth Day of July, 1992

Attest:

DOUGLAS B. COMER

Attesting Officer     Acting Commissioner of Patents and Trademarks